United States Patent [19]
Oldfelt et al.

[11] Patent Number: 5,245,711
[45] Date of Patent: Sep. 21, 1993

[54] VACUUM TOILET SYSTEM

[75] Inventors: Sven Oldfelt, Vaxholm, Sweden; Gary L. Stahl, Winnebago; Bjorn M. Still, Rockford, both of Ill.

[73] Assignee: Oy Wärtsilä Ab, Helsinki, Finland

[21] Appl. No.: 394,072

[22] Filed: Aug. 15, 1989

[30] Foreign Application Priority Data

Sep. 6, 1988 [SE] Sweden .................. 8803119
Sep. 6, 1988 [SE] Sweden .................. 8803120

[51] Int. Cl.$^5$ ............................ E03D 11/10
[52] U.S. Cl. ............................ 4/435; 4/431
[58] Field of Search ........... 4/316, 323, 665, 431, 4/435, 436, 432, 433

[56] References Cited

U.S. PATENT DOCUMENTS

| | | | |
|---|---|---|---|
| 3,154,796 | 11/1964 | Bruce | 4/431 |
| 3,329,974 | 7/1967 | Belasco et al. | 4/316 |
| 3,995,327 | 12/1976 | Hendrick | 4/10 |
| 4,063,315 | 12/1977 | Carolan et al | 4/316 |
| 4,376,314 | 3/1983 | Iwans | 4/431 |
| 4,521,925 | 6/1985 | Chen et al. | 4/323 |
| 4,713,847 | 12/1987 | Oldfelt et al. | 4/316 |

FOREIGN PATENT DOCUMENTS

| | | |
|---|---|---|
| 108419 | of 0000 | Denmark . |
| 3110558 | 4/1983 | Fed. Rep. of Germany . |
| 3536691 | 4/1987 | Fed. Rep. of Germany . |
| 2286922 | 4/1976 | France . |
| 355040 | of 0000 | Sweden . |

Primary Examiner—Charles E. Phillips
Attorney, Agent, or Firm—Smith-Hill & Bedell

[57] ABSTRACT

A vacuum toilet system comprises a toilet bowl having a cover mounted for movement relative to the toilet bowl between an open position and a closed position, the cover being in at least partially sealing relation with the rim when in the closed position. A liquid supply opening is provided for introducing liquid into the toilet bowl when the cover is in the closed position. A discharge valve connects the outlet opening of the toilet bowl to a sewer pipe, in which a partial vacuum can be established. A reservoir has an inlet opening for receiving rinse liquid and an outlet opening in communication with the liquid supply opening. The inlet opening of the reservoir is exposed to substantially the same pressure as the liquid supply opening when the toilet bowl cover is in the open position and the discharge valve is closed. Rinse liquid is drawn from the reservoir into the toilet bowl by way of the liquid supply opening when the discharge valve is open and the cover is in the closed position.

9 Claims, 5 Drawing Sheets

VACUUM TOILET SYSTEM

BACKGROUND OF THE INVENTION

This invention relates to a vacuum toilet system.

Vacuum toilet systems have been known for many years. The modern vacuum toilet system comprises a waste-receiving bowl, a sewer pipe that can be placed under a pressure that is substantially lower than that in the interior of the waste-receiving bowl, and a discharge valve for controlling passage of the material from the waste-receiving bowl into the sewer pipe. A rinse liquid outlet is provided near the rim of the waste-receiving bowl and is connected through a rinse liquid valve to a source of pressurized rinse liquid. During a flush cycle, in which the discharge valve is opened, the rinse liquid valve is opened and rinse liquid is introduced into the waste-receiving bowl.

Non-recirculating vacuum toilet systems using plain water as a rinse liquid are attractive for use in aircraft. In such a system, it is conventional for the rinse liquid to be provided from the aircraft's potable water system. The potable water system includes a tank, pipes connecting the tank to consuming devices, such as the vacuum toilets and hand basins, and a pump for maintaining the water in the pipes under pressure.

An aircraft toilet system comprises a holding tank for receiving waste material from the waste-receiving bowl. In order to avoid transporting material that could be discharged from the aircraft in flight, gray water, i.e., water that, though not potable, can be discharged into the environment without treatment, e.g. water from hand basins and from galley sinks, is not fed into the vacuum toilet system so that it enters the holding tank but is discharged from the aircraft through a drain mast.

U.S. Pat. No. 4,713,847 issued Dec. 22, 1987, the disclosure of which is hereby incorporated by reference herein, discloses a vacuum toilet system in which a pump is used to deliver rinse water to a toilet bowl under control of a valve that is opened in response to actuation of a flush switch.

It has been proposed that an aircraft vacuum toilet system should employ gray water as the rinse liquid for the vacuum toilets. According to this proposal, which, as far as the applicants are aware, has not been reduced to practice, a reservoir for collecting gray water would be provided, and each toilet would be provided with means for drawing gray water from the reservoir and delivering it to the toilet in response to actuation of a flush switch.

SUMMARY OF THE INVENTION

A preferred embodiment of the invention in a first aspect is a vacuum toilet system comprising a toilet bowl, a sewer pipe, a discharge valve connecting the outlet opening of the toilet bowl to the sewer pipe, a source of partial vacuum for establishing a lower pressure in the interior space of the sewer pipe than in the toilet bowl, and means defining a rinse liquid outlet for introducing rinse liquid into the toilet bowl. A reservoir collects water from the outlet of a water utilization unit such as a hand basin, a sink, or the like, and water is delivered from the reservoir to the rinse liquid outlet. Purification means provide at least one purification of water delivered from the water utilization unit to the rinse liquid outlet.

A preferred embodiment of the invention in a second aspect is a vacuum toilet system comprising a toilet bowl having a cover mounted for movement relative to the toilet bowl between an open position and a closed position, the cover being in at least partially sealing relation with the rim when in the closed position. A liquid supply opening is provided for introducing liquid into the toilet bowl when the cover is in the closed position. A discharge valve connects the outlet opening of the toilet bowl to a sewer pipe, in which a partial vacuum can be established. A reservoir has an inlet opening for receiving rinse liquid and an outlet opening in communication with the liquid supply opening. The inlet opening of the reservoir is exposed to substantially the same pressure as the liquid supply opening when the toilet bowl cover is in the open position and the discharge valve is closed. Rinse liquid is drawn from the reservoir into the toilet bowl by way of the liquid supply opening when the discharge valve is open and the cover is in the closed position.

BRIEF DESCRIPTION OF THE DRAWINGS

For a better understanding of the invention, and to show how the same may be carried into effect, reference will now be made, by way of example, to the accompanying drawings in which.

In the various Figures, like reference numerals designate corresponding components.

DETAILED DESCRIPTION

Figure 1:
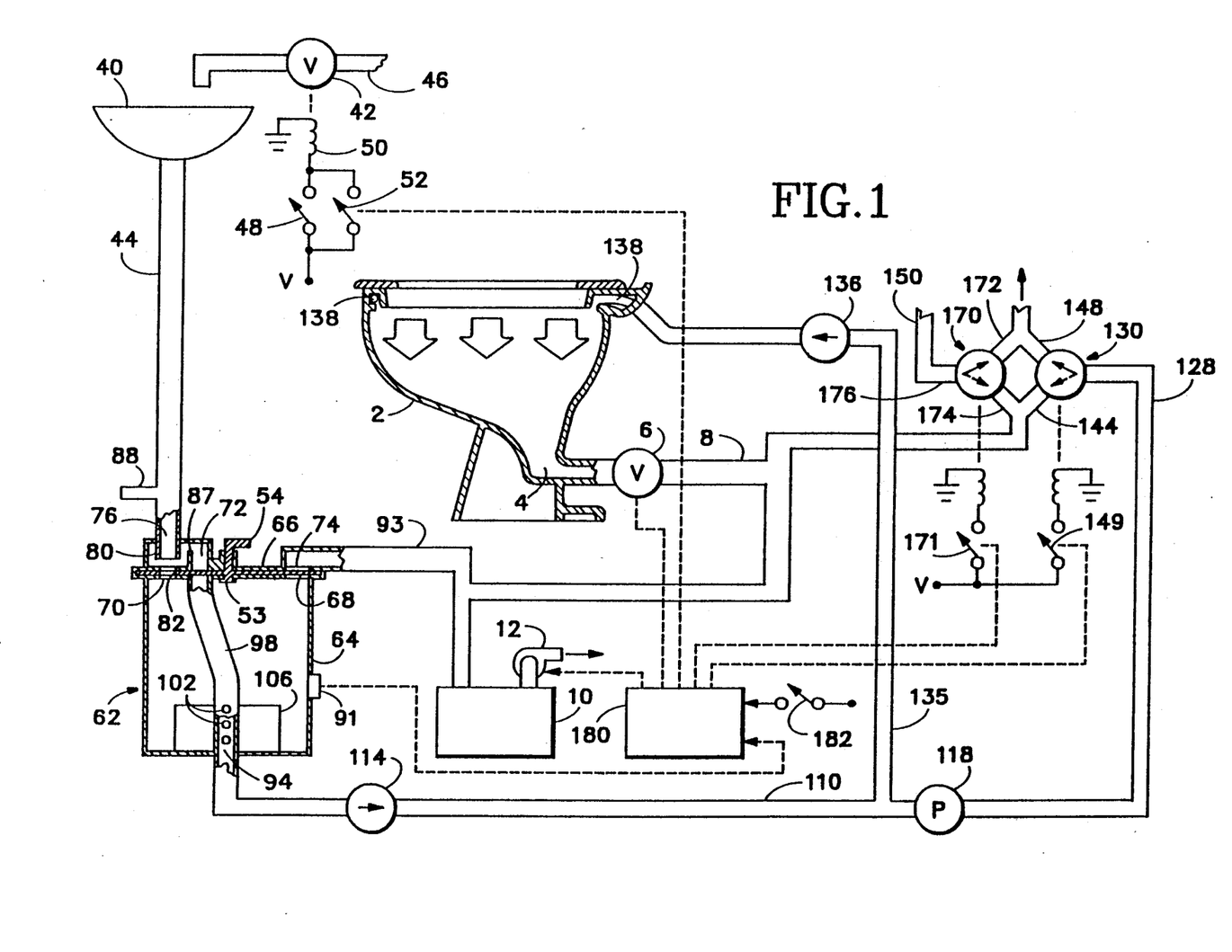
FIG. 1 is a schematic diagram of a vacuum toilet system embodying the present invention, including a toilet bowl, a gray water reservoir and a pump, the toilet system being shown in its normal operating condition, immediately before a flush cycle.

The vacuum toilet system illustrated in FIG. 1 is designed to be installed in a pressurized aircraft and comprises a toilet bowl 2 which defines an interior space for receiving waste material and has an outlet opening 4. The outlet opening is connected to one side of an electrically driven discharge valve 6, and the opposite side of the discharge valve is connected through a sewer pipe 8 to a holding tank 10. The discharge valve 6 controls flow of material from the toilet bowl to the holding tank. A pressure difference of about 250 mbar is required to operate the system illustrated in FIG. 1. Sufficient pressure difference for operating the system exists between the cabin of the aircraft and the ambient atmosphere when the aircraft is at an altitude greater than about 5,000 m. If the pressure difference between the cabin of the aircraft and the ambient atmosphere is too low, a blower 12 is used to establish a sufficient pressure difference. Reference may be made to U.S. Pat. No. 4,713,847 for further information regarding the manner in which material is transported to the tank and removed from the tank.

The vacuum toilet system also comprises a hand basin 40 having a cold water valve 42, and an outlet pipe 44. The cold water valve 42 is connected through a pipe 46 to a source (not shown) of water under pressure. The cold water valve 42 is solenoid-operated and automatically closing. When a user presses a button (not shown), a switch 48 is closed and supplies electrical current to a solenoid 50, which opens the valve 42. When the supply of current is discontinued, e.g. by removing pressure from the button, the valve 42 closes. A secondary cold water supply switch 52 is connected in parallel with the switch 48.

The outlet pipe of the hand basin 40 is connected to a gray water reservoir 62. The gray water reservoir comprises a lower housing 64 and an upper housing 66. The upper and lower housings define three passages 70, 72 and 74 that are controlled by a valve disc 68, which has openings 82, 84 and 86, shown also in FIG. 3. The valve disc 68 is located between the upper and lower housings and is mounted on a shaft 53, which is rotatably supported by the housings 64 and 66.

The disc 68 is coupled through the shaft 53 and an arm 54 (FIG. 2) that extends radially of the shaft 53 to a vacuum-actuated motor 152 which is operable to rotate the disc 68 selectively to a position in which the passage 70 is open or a position in which the passages 72 and 74 are open. The motor 152 comprises a cylinder 154 in which a piston 156 is slidingly fitted so that it defines a chamber of variable volume. The piston 156 is provided in FIG. 2. A spring 162 urges the piston 156 towards the position shown, in which the passage 70 is open. When the piston 156 is in another end position more to the right of FIG. 2, the passages 72 and 74 are open.

Figure 2:
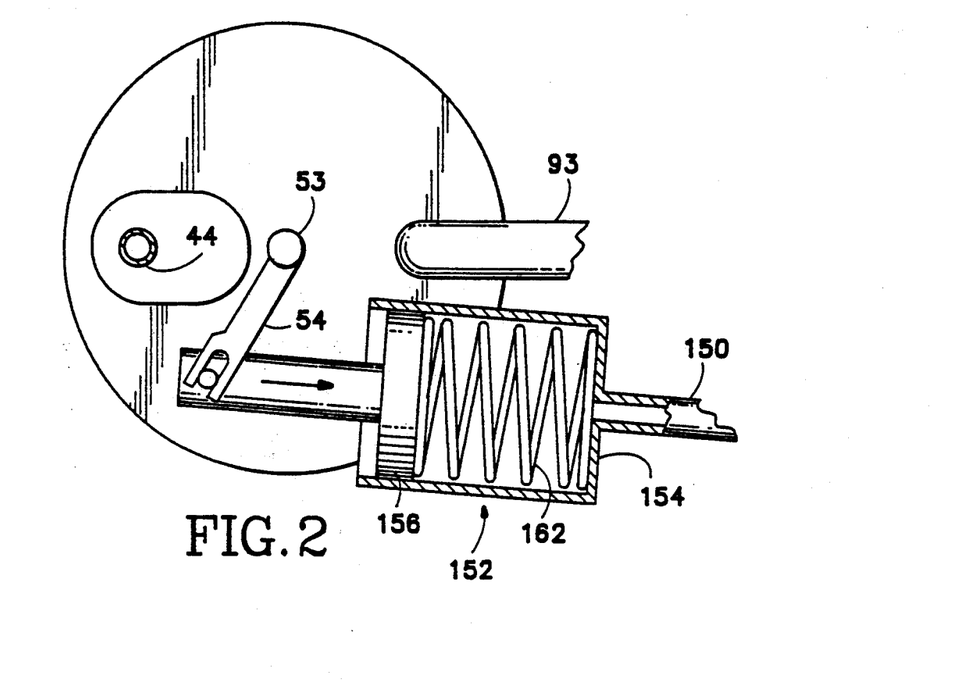
FIG. 2 is a top plan view, partly in section, of the gray water reservoir when the toilet system is in its normal operating condition.

The outlet pipe 44 enters the reservoir 62 through an inlet opening 76 aligned with the passage 70 and in open communication with the passage 72. However, a sleeve 80 extends downwardly from the opening 76 and a wall 87 extends upwardly from the passage 72, to a level above the lower end of the sleeve 80, and therefore water that passes through the opening 76 will not enter the passage 72 unless the passage 70 is closed and the passage 72 is open.

The passage 74, which like the passage 70, is in direct, open communication with the interior space of the reservoir, is connected through a pipe 93 to the sewer pipe 8 at a point downstream of the discharge valve 6.

An overflow pipe 88, which is connected to a drain system under cabin pressure, branches from the outlet pipe 44 just above the reservoir 62. The reservoir 62 is provided with a level detector 91, which provides an electrical signal in the event that the free surface of water in the reservoir falls below the level detector.

At a bottom of the reservoir 62 there is a discharge opening 94 which is coupled to the passage 72 by a pipe 98. At its lower end, the pipe 98 is formed with openings 102 and is surrounded by a filter 106.

The discharge opening 94 at the bottom of the reservoir 62 is connected through a pipe 110, provided with a check valve 114, to a pressure actuated pump 118. The pump is also connected through a rinse water supply pipe 135, provided with a check valve 136, to a spray nozzle system 138 at the rim of the toilet bowl 2.

The pump 118 is connected to one port 128 of a three-way solenoid valve 130. The valve 130 has a second port 144, which is connected to the sewer pipe, and a third port 148, which is exposed to cabin pressure. The valve 130 is controlled by a switch 149. When the switch 149 is closed, the solenoid operates the valve 130 to connect the port 128 to the port 144 and the partial vacuum applied to the pump causes a metered quantity of water to be discharged from the pump by way of the pipe 135. When the switch 149 is open, the valve connects the port 128 to the port 148 so that cabin pressure is applied to the pump and water is drawn into the pump from the pipe 110. A second solenoid valve 170, controlled by a switch 171, has one port 172 connected to the sewer pipe, and a third port 176 connected through a pipe 150 to the motor 152 (FIG. 2). When the switch 171 is open, the valve 170 communicates cabin pressure to the motor 152, and the spring 162 urges the piston 156 to the position shown in FIG. 2 so that the disc 68 is placed in the position in which the passage 70 is open. When the switch 171 is closed, the valve 170 communicates partial vacuum to the motor 152 so that the piston 156 moves in the direction of the arrow in FIG. 2 and the passages 72 and 74 are opened.

A flush control unit 180 receives inputs from a flush initiation switch 182, which is controlled by a flush control button (not shown), and the level detector 91, and provides outputs to control the states of the discharge valve 6 and the switches 52, 149 and 171. The flush control unit 180 receives other inputs and provides other outputs that are not germane to the present invention.

The flush control unit has two modes of operation, namely a normal flush mode and a backwash mode. In the normal flush mode, the flush control unit ensures that the level of water in the reservoir remains at least as high as the level detector 91. If the water level in the reservoir falls below the level detector 91, the flush control unit closes the switch 52 and the valve 42 opens and cold water is supplied to the reservoir for a predetermined time. The volume of water in the reservoir is then greater than what is needed for one flush cycle. If the reservoir 61 is filled, and water backs up in the outlet pipe 44 to the overflow pipe 88, any additional water that enters the pipe 44 overflows through the pipe 88 and is discharged from the aircraft by way of the drain system.

When the flush control button is pressed, the switch 182 is closed and the flush control unit 180 responds by initiating a flush cycle. During the flush cycle, the flush control unit opens and closes the discharge valve 6, to remove waste material from the toilet bowl. The construction and manner of operation of the discharge valve are not pertinent to the invention, nor is the sequence in which the discharge valve is operated and rinse water is supplied and therefore these matters will not be described herein. Also, the flush control unit ensures that a sufficient degree of vacuum exists in the holding tank, but the manner in which this is achieved is not pertinent to the invention and will not be described herein. Reference may be made to U.S. Pat. No. 4,713,867. The present invention is concerned with the means whereby the rinse water is supplied.

At a predetermined time in the flush cycle, the flush control unit closes the switch 149 and thereby actuates the valve 130 to connect the port 144 to the pump 118, so that water is discharged from the pump through the rinse water supply pipe 135 and the check valve 136 to the spray nozzle system 138. Subsequently, the flush control unit opens and the switch 149 and the valve 130 places the port 148 in communication with the pump, so that water is drawn from the reservoir through the filter 106, the discharge opening 94, the pipe 110 and the check valve 114, into the pump, recharging the pump.

In order to prevent the filter from becoming blocked, it is necessary to clean the filter from time to time. This is accomplished when the aircraft is on the ground and is being serviced, by operating in the backwash mode. In the backwash mode, the flush control unit energizes the blower 12 for establishing a partial vacuum in the holding tank. The flush control unit also closes the switch 52 so that the cold water valve 42 is opened, supplying clean water to the hand basin. When sufficient time has elapsed to ensure that any solid material in the hand basin or the outlet pipe 44 will have been washed in the reservoir 62, the switch 52 is opened. The switch 171 is then closed so that the solenoid valve 170 connects the port 174 to the port 176, applying vacuum to the motor 152. Consequently, the disc 68 is rotated, closing the passage 70, so that air cannot enter the reservoir through that passage, and opening the passages 72 and 74. Opening of the passage 74 applies a subatmospheric pressure to the reservoir 62, and therefore a flow of air is established from the hand basin through the outlet pipe 44, the passage 72, the pipe 98, the apertures 102, the filter 106, the interior space of the reservoir 62 and the passage 74, into the pipe 93. This flow of air displaces solid material from the filter and ensures that the solid material does not settle into the bottom of the reservoir but is entrained in the flow and is removed from the reservoir by way of the passage 74, the pipe 93 and the sewer pipe 8.

Figure 3:
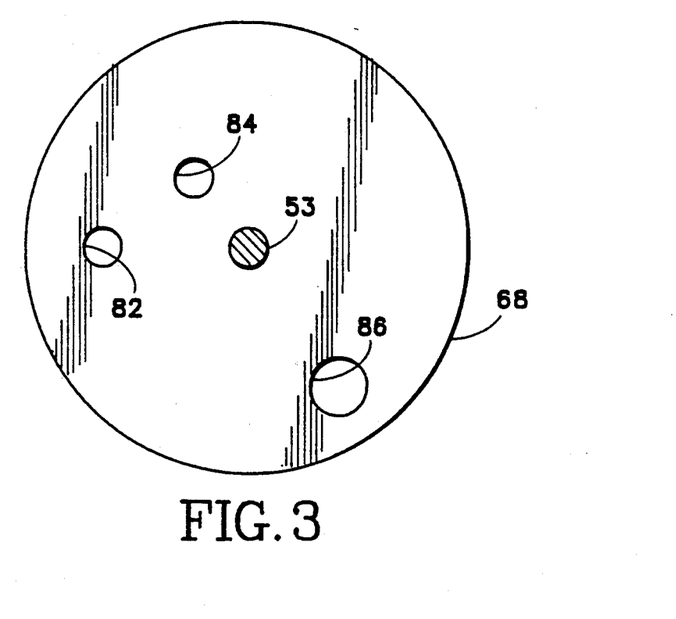
FIG. 3 is a top plan view of the disc member of a disc valve that is incorporated in the gray water reservoir.

The vacuum toilet system shown in FIGS. 1-3 allows use of gray water for toilet rinsing, and thus reduces the amount of water that needs to be carried by an aircraft equipped with a non-recirculating vacuum toilet system. The system is not limited to use of gray water for toilet rinsing, and does not require that all gray water be used for toilet rinsing or otherwise delivered to the holding tank.

Figure 4:
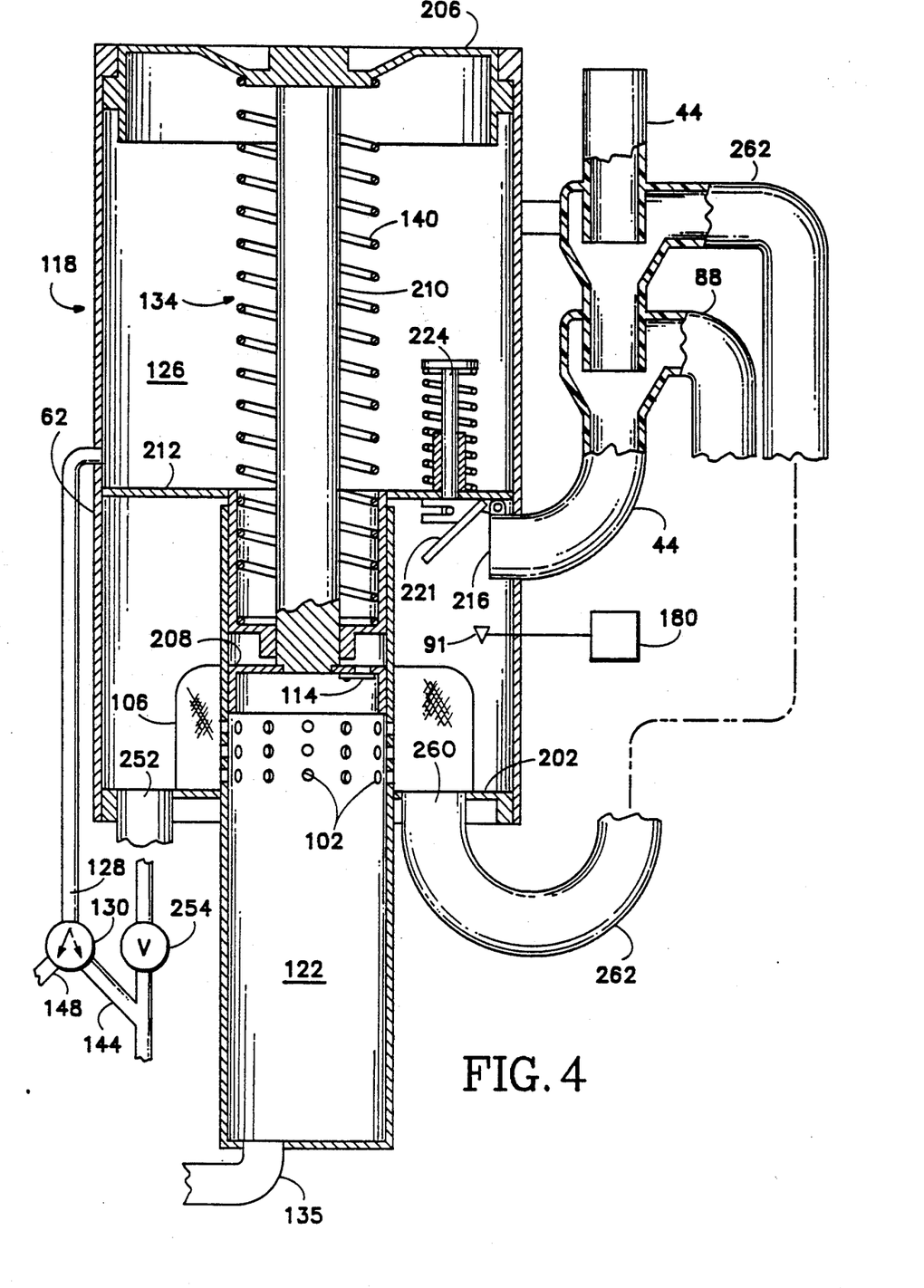
FIG. 4 is a sectional view of a combination pump and gray water reservoir used in a modification of the FIG. 1 system.

FIG. 4 shows a modification of FIGS. 1-3, in which the reservoir 62 is integrated with the pump 118. The pump 118 comprises a housing that defines two coaxial cylindrical bores, and a compound piston member 134 that has large and small diameter pistons 206, 208 connected by a rod 210. The pistons 206, 208 fit slidingly in the two bores respectively, whereby two chambers 122 and 126, whose volumes depend on the position of the piston member 134, are formed. A spring 140 urges the piston member 134 towards the position in which the chambers 122 and 126 are of maximum volume. The reservoir 62 is annular and surrounds the smaller bore of the pump 118 over part of its length and has an annular bottom wall 202. The smaller piston 208 incorporates the check valve 114, depicted schematically as a flap covering a hole in the smaller piston. The chamber 126 is separated from the reservoir 62 by a wall 212 and the rod 210 extends through an opening in the wall 212. The holes 102 are formed in the wall of the chamber 122.

The outlet pipe 44 opens at its lower end into the reservoir 62 through a port 216, which is controlled by a valve 221, normally held open by a spring loaded plunger 224 which extends through the wall 212. The filter 106 is seated against the bottom wall 202 of the reservoir 62 and extends above the holes 102.

The bottom wall 202 is formed with a port 252 which communicates through a normally closed valve 254 with the vacuum sewer line 8. The wall 202 is also formed with a port 260, which is connected to the lower end of a pipe 262, the upper end of which is connected to the outlet pipe 44 above the level of the overflow pipe 88.

When the valve 130 is in its normal position, so that it communicates cabin pressure to the chamber 126, the spring 140 forces the compound piston member 134 upwards, to the position shown in FIG. 4. Assuming that the chamber 122 and the reservoir 62 are empty, gray water from the hand basin flows through the pipe 44 and into the reservoir 62 through the port 216. The valve 254 is closed, and therefore the gray water drains through the filter 106 into the chamber 122 and fills the rinse water line 135. Assuming that sufficient gray water is supplied, the reservoir 62 and its feed pipe 44 are filled to the level of the overflow pipe 88. The overflow pipe 88 is slightly below the spray nozzle system 138, and therefore excess gray water will overflow through the pipe 88 and not through the spray nozzle system. Water also drains into the pipe 262, which is filled to the level of the overflow pipe. When the flush control button is pressed, the flush control unit 180 (FIG. 1) causes the valve 130 to swing to its second position, thereby closing to cabin pressure and opening to vacuum. Partial vacuum is applied to the chamber 126, and cabin pressure applied to the top of the larger piston 206 forces the piston assembly 134 downwards against the force of the spring 140. The water in the chamber 122 is pressurized and is expelled from the chamber 122 through the rinse water line 135 and the spray nozzle system 138. As the piston assembly moves down, water in the reservoir 62 drains through the filter 106, filling the space on top of the smaller piston 208. After sufficient time for the piston assembly to reach its bottom position, e.g. about 0.5 seconds, the valve 130 swings back to its normal position, disconnecting the chamber 126 from the sewer line and connecting it to cabin pressure. The spring 140 pushes the piston assembly 134 back to its top position, while the check valve 114 in the smaller piston 208 allows water to pass from the upper side of the piston 208 to the lower side thereof, filling the chamber 122. Thus, the pump is ready for the next stroke.

In the event that the level of water in the reservoir 62 falls below the level detector 91, the level detector provides a signal to the flush control unit, and the flush control unit closes the switch 52 so that potable water is supplied to the basin 40 to restore the level of water in the reservoir 62.

Solid material in the gray water that enters the reservoir 62 is trapped by the filter 106, so that it does not enter the chamber 122. The filter 106 is cleaned by back washing when the aircraft is being serviced.

In order to backwash the filter 106, partial vacuum is established in the sewer pipe 8 and the flush control unit opens the valve 254. Any water in the reservoir 62 and the outlet pipe 44 is removed by way of the port 252. The valve 130 is swung to its second position, and the piston member 134 is forced downwards. When the piston member reaches its bottom position, the larger piston 206 engages the plunger 224 and forces it downwards, causing the valve 221 to close the port 216, thereby preventing air from entering the reservoir by way of the port 216. Therefore, water present in the pipe 262 is drawn into the reservoir and passes through the filter 106 in the reverse direction, removing solid material deposited on the exterior of the filter. When the water has been exhausted from the pipe 262, air is drawn into the reservoir through the pipe 262 and the filter 106. Solid material removed from the filter is removed from the reservoir 62 by way of the port 252 and enters the sewer line 8. After sufficient time to ensure a reliable backwash, for example about 5 seconds, the valve 234 is closed and the valve 130 is swung to its normal position.

It will be appreciated that during a normal flush, the valve 221 will be closed if partial vacuum is applied to the chamber 126 for a sufficient time, but this has no effect on operation of the vacuum toilet system.

The systems described with reference to FIGS. 1-4 are subject to disadvantage, in that each includes a pump and valves and requires a filter to protect the pump and valves, and to prevent blockage of the spray nozzle system. Moreover, each includes a level detector to ensure that there will always be sufficient water in the reservoir 62 to execute a flush. Since a large passenger aircraft might have about 15 toilets, each with its own reservoir and level detector, the risk of failure of a level detector is significant, and if a level detector fails, the entire potable water system might be emptied. Further, in the systems shown in FIGS. 1-4, the flow of air into the toilet bowl does not have a significant cleansing effect.

Figures 5, 6:
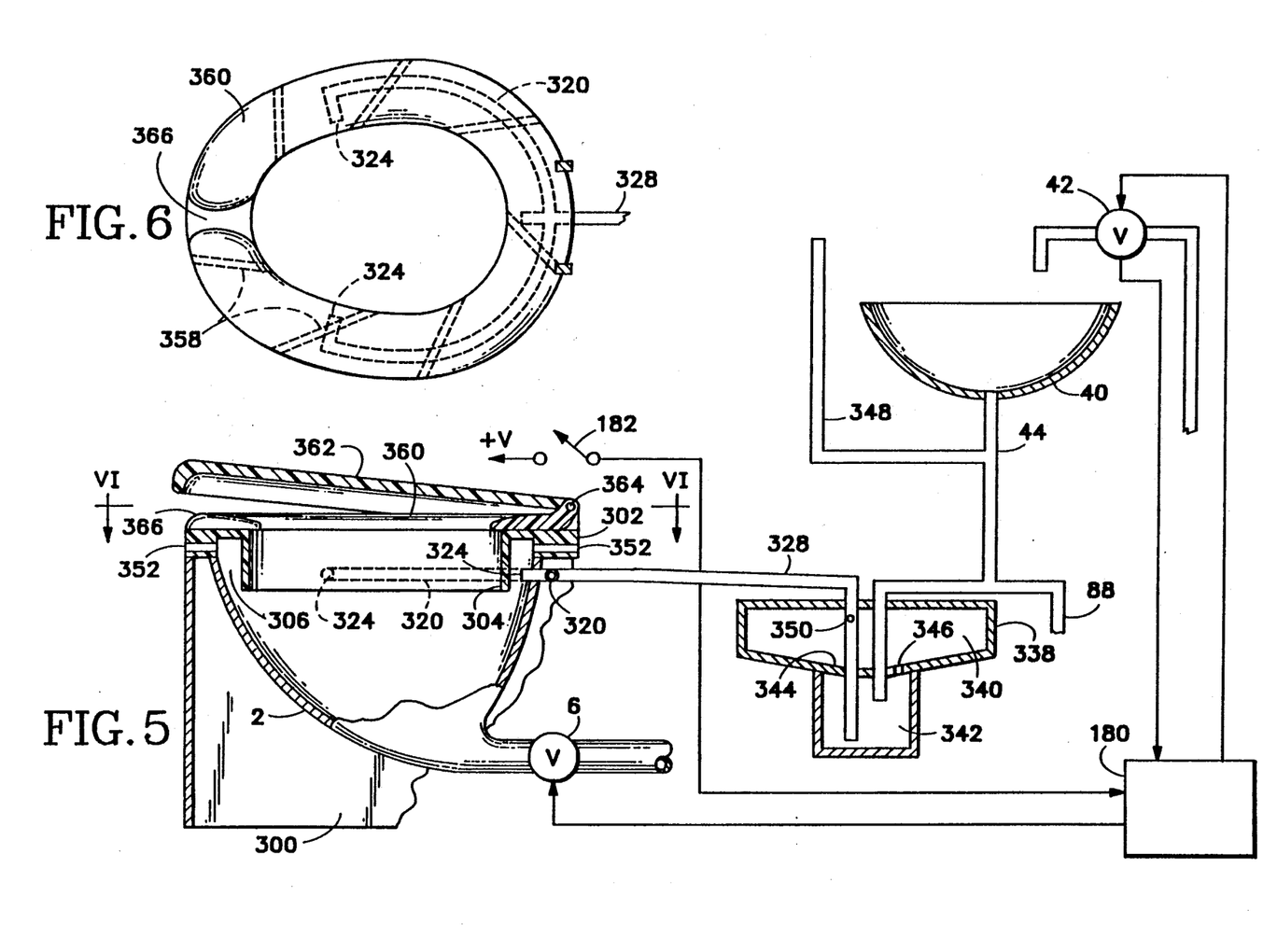
FIG. 5 is a part sectional schematic view of a second vacuum toilet system embodying the present invention.
FIG. 6 is a sectional view taken on the line VI—VI of FIG. 5.

In the system illustrated in FIGS. 5 and 6, the toilet bowl 2 is mounted in an external shroud 300 which is spaced from the toilet bowl. An air supply member 302 made of moulded synthetic polymer material is secured to the rim of the toilet bowl and bridges the space between the toilet bowl and the shroud. The member 302 is generally annular and includes a flange 304 which extends downwardly into the bowl in spaced relationship from the interior surface of the bowl. Accordingly, an annular channel 306 is defined between the flange 304 and the interior surface of the bowl.

Inside the shroud 300 is a rinse water distribution pipe 320 which extends about two-thirds of the way around the toilet bowl. The pipe opens into the annular channel 306 by way of three ports 324, one at each end of the pipe 320 and one intermediate its ends. A deflector plate (not shown) is positioned in front of each port 324. In a modification of the toilet system shown in FIGS. 5 and 6, the rinse water distribution pipe 320 might extent about three-quarters of the way around the toilet bowl and have four outlet ports spaced approximately equally around the toilet bowl.

The rinse water distribution pipe 320 is connected by a rinse water supply pipe 328 to a reservoir 338, which receives gray water from the hand basin 40. The reservoir 338 is preferably placed close to the toilet bowl 2, in order to minimize the length of the pipe 328. However, it might alternatively be placed directly below the hand basin 40 like an enlarged water trap. The reservoir 338 is divided into upper and lower compartments 340, 342, which are separated by a wall 344 formed with a drain hole 346. The rinse water supply pipe 328 extends almost to the bottom of the lower compartment 342, and is formed with a small vent hole 350 just below the top of the upper compartment 340. The drain pipe 44 is configured so that it drains easily into the reservoir 338. The overflow 88 is placed close to the reservoir to minimize the amount of water stored in the pipe 44 when the reservoir is filled up to the level of the overflow. The drain pipe 44 opens into the lower compartment 342, and when the lower compartment is full, additional gray water delivered into the lower compartment enters the upper compartment through the hole 346. When full, the lower compartment 342 contains enough water for one flush of the toilet, for example about 0.2 l. The aircraft cabin pressure is communicated to the lower compartment by the hand basin drain pipe 44 and by the rinse water supply pipe 328, the vent hole 350 and the drain hole 346.

The air supply member 302 is formed with numerous bores 352 which extend into the channel 306. The bores 352 are spaced apart around the member 302. In a practical implementation of the invention, there may be eighty such bores 352. For clarity of illustration, the bores 352 are shown in FIG. 5 as extending radially, but in fact the bores are inclined at an angle of about 5°-10° from the radial direction and all extend into the channel 306 in the counterclockwise direction with respect to the member 302, when viewed in plan. At its upper surface, the air supply member 302 is formed with groves 358. The groves 358 extend semi-tangentially with respect to the member 302 and are all directed inwardly in the counterclockwise direction when viewed from above. Of course, the bores 352 and groves 358 may be directed clockwise instead of counterclockwise into the toilet bowl.

The toilet bowl 2 is provided with a seat 360 and a cover 362. The seat and the cover are mounted to the air supply member 302 by a hinge 364. When the seat 360 is lowered, it engages the air supply member 302 and closes the grooves 358 at the top. The seat 360 is formed with a gap 366 at the front of the toilet bowl. The cover 362 is shaped so that when it is lowered, the aircraft cabin is not in direct open communication with the interior of the toilet bowl through the gap 366. The purpose of the gap 366 is to provide a rapid flow of air into the toilet bowl, and thereby prevent build-up of underpressure therein, in the event of a malfunction that causes the valve 6 to open when the toilet is in use.

The hinge 364 incorporates the flush initiation switch 182, which is shown only schematically in FIG. 5. Alternatively, the switch 182 might have an actuator button that is engaged by a lever, e.g., when the cover 362 is closed. The flush initiation switch 182 is closed automatically when the cover is closed, and remains open when the cover is open.

When the cover of the FIGS. 5 and 6 toilet is lowered, the flush control unit 180 issues a flush signal in response to the closing of the switch 182, and the discharge valve 6 is opened. Suction is applied to the interior space of the toilet bowl, and this suction ensures that the cover is held down in firm, sealing relationship against the seat. Due to the partial vacuum established in the interior space of the toilet bowl, air is drawn into the interior space of the toilet bowl through the grooves 358 and the bores 352. The air that enters the annular channel 306 through the bores 352 has a substantial peripheral component of velocity and therefore executes a swirling motion about the interior space of the bowl. The air entering the toilet bowl through the channels 358 executes a similar swirling motion.

When partial vacuum is established in the toilet bowl, suction is applied through the ports 324 and the water distribution pipe 320 to the water supply pipe 328. Water is drawn into the pipe 328 from the lower compartment and is discharged into the channel 306 through the ports 324. The water leaving the pipe 320 through the ports 324 impinges on the deflector plates, which cause the water to spray upwards and to the side. The water entering the channel 306 is entrained into the swirling flow of air from the bores 352 and executes a similar swirling motion, cleansing the interior surface of the bowl. The flow of air add kinetic energy to the flow of rinse water, enhancing the cleansing action of the water. The turbulent motion of air and water in the bowl may create a mist, which may flow upwards in the space defined by the interior surface of the flange 304 and result in deposit droplets on the underside of the cover 362 and on the seat 360. This upward flow of mist is inhibited by the flow of air through the grooves 358.

When suction is applied to the water supply pipe 328, some air or water (depending on the filling level of the reservoir) is drawn from the upper compartment 340 into the pipe 328. When the liquid level in the lower compartment has fallen below the lower end of the pipe 14, air is sucked into the upper compartment through the vent 348. Since air is passing upwards through the drain hole, the lower compartment is not refilled by gravity flow from the upper compartment during a flush. When the discharge valve 6 is closed, water from the upper compartment 340 drains into the lower compartment 342, refilling the lower compartment. Thus, the reservoir 338 functions as a metering device which, at each flush, delivers a volume of water approximately equal to the volume of the lower compartment plus the volume of water in the pipes 44 and 328 above the lower compartment. In order to minimize variations in volume, the pipes 44 and 328 should be relatively narrow, e.g. 1.25 cm in diameter.

The pipe 328 slopes downwards towards the reservoir, so that when a flush is completed. water remaining in the pipe drains back into the reservoir, minimizing gray water usage.

In an aircraft, the degree of partial vacuum that is established in the toilet bowl when the discharge valve is opened can vary quite widely. Also, in some aircraft vacuum toilet systems the flush time depends on the location of the toilet bowl (forward or aft). Therefore, the reservoir 338 is designed so that at low vacuum and short flush time, the lower compartment of the reservoir is just barely emptied. At higher vacuum and/or longer flush time, the lower compartment is emptied well before the discharge valve 6 is closed.

For proper functioning of the system shown in FIGS. 5 and 6, it is necessary that the flow resistances of the three paths for delivering air and water to the toilet bowl be balanced, so that the functions of the various flows are achieved. The proper balance is best achieved through experimentation. For example, it has been found that the greater part of the air flow should be provided through the bores 352.

When the aircraft is first brought into service at the beginning of a working day, the flush control unit automatically performs a power-up routine in which it opens the hand basin valve 42 for sufficient time to provide enough water to give up to five flushes. The flush control unit counts the number of flushes during the day and the number of times that the hand basin valve is opened under manual control, and utilizes this information to determine when there is a danger that the reservoir 338 is approaching an empty condition. If the flush control unit determines that the reservoir is approaching an empty condition, it causes the hand basin valve to open and provide additional water to the reservoir. In this manner, the need for a level detector in the reservoir is avoided. Moreover, because the water supplied through the outlet ports 324 is effectively distributed over the interior surface of the toilet bowl by the flow of air entering the toilet bowl, there is no need for fine spray nozzles. Furthermore, there are no valves or pumps between the reservoir and the ports 324. Accordingly, the need for a filter is avoided and this in turn avoids the need to be able to backwash the filter. Of course, a strainer may be provided in the pipe outlet of the hand basin or in the drain pipe 44 to catch objects such as matches and buttons.

The swirling flow of air that enters the toilet bowl of the FIGS. 5 and 6 system is quite effective at cleansing the toilet bowl even without the aid of rinse water. Therefore, in a modification of the FIGS. 5 and 6 system the flush control unit is designed without the ability to count the number of flushes, so that if the reservoir runs dry, the toilet bowl is cleansed by the air flow only. In fact, the likelihood of the reservoir running dry is quite small, because normally more gray water is produced through use of the hand basin than is required for toilet flushings. In this modification, no overflow pipe is provided, so that excess gray water is not discharged from the aircraft in flight but passes into the toilet bowl and thence to the waste tank.

The toilet system shown in FIGS. 5 and 6 is not restricted to use on an aircraft, and a system similar to that shown in FIGS. 5 and 6 might be installed in a ship or train, for example. In the case of a system designed for use otherwise than on an aircraft, factors relating to the type of installation might dictate modifications. For example, in the case of a system on a ship, where the volume of waste is unimportant because it is pumped overboard, the pipe 328 might slope down towards the toilet bowl so that at the end of a flush, water in the pipe 328 drains into the toilet bowl and forms a pool of water. In a toilet system on a train, the degree of vacuum and the flush time are not subject to large variation, and therefore a simpler reservoir may be employed. In such a reservoir, there would be distinct upper and lower compartments, and the volume of gray water withdrawn on each flush would be determined just by the degree of partial vacuum and the flush time.

When designed for use in an aircraft, a vacuum toilet system as shown in FIGS. 1-3, possibly modified in accordance with FIG. 4, or as shown in FIGS. 5 and 6, may be incorporated in a self-supporting module that is installed in the aircraft as a unit. The module comprises a toilet bowl and associated discharge valve, a hand basin, a reservoir and, in the case of FIGS. 1-4, a pump and filter. The module is self-contained except for connections to the vacuum sewer, the potable water supply and, if necessary, the aircraft drain system. In the aforesaid modification of the FIGS. 5 and 6 system, where no overflow pipe is provided, relocation of the toilet module is facilitated because there is then no gravity line leaving the module.

Figure 7:
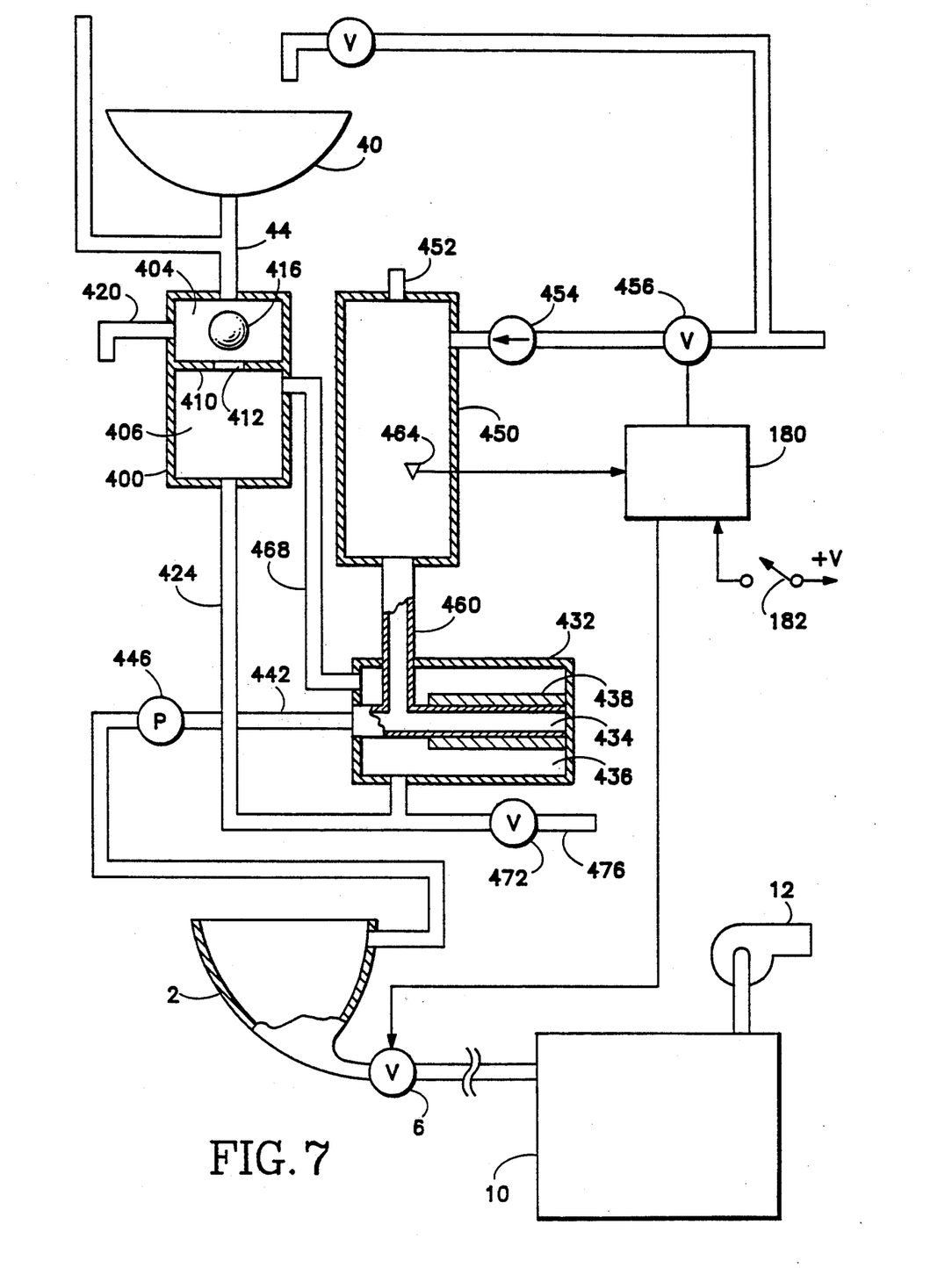
FIG. 7 is a schematic illustration of a third vacuum toilet system embodying the present invention.

FIG. 7 illustrates a gray water flush system developed for use on a railroad train. It will be appreciated that space and weight constraints are not generally as severe on a train as on an aircraft, and moreover variations in the direction of gravity relative to the railroad cars are not as great as the variations in the direction of gravity relative to an aircraft.

In the toilet system shown in FIG. 7, the drain pipe 44 opens into a gray water reservoir 400 having an upper compartment 404 and a lower compartment 406 separated by a wall 410 formed with a hole 412. A float 416 is disposed in the upper compartment 404, which is connected to an overflow 420.

A tube 424 connects the bottom of the reservoir 400 to a filter housing 432. The interior space of the filter housing is divided into inner and outer chambers 434, 436 by a filter element 438. The tube 424 opens into the outer chamber 436. The inner chamber of the filter housing is in direct open communication, through a tube 442, with the inlet side of a pump 446, the outlet side of which is connected to the spray nozzles of the toilet bowl 2.

A clean water reservoir 450 is mounted adjacent the gray water reservoir 400. The clean water reservoir 450 is connected to the train's potable water supply through a check valve 454 and a solenoid valve 456. The clean water reservoir 450 has an air vent opening 452 at its top and is connected at its bottom by a tube 460 to the inner chamber 434 of the filter housing 432. The clean water reservoir 450 is provided with a level sensor 464. If the level of water in the clean water reservoir falls below the level sensor, the level sensor issues a signal to the flush control unit, and the flush control unit in turn issues a signal that causes the solenoid valve 456 to open, supplying water to refill the clean water reservoir to a level above the level sensor. The outer chamber 436 of the filter housing 423 is connected to the top of the upper compartment 406 of the gray water reservoir by a tube 468. The gray water reservoir 400 and the clean water reservoir 450 communicate through the filter. Therefore, the level of gray water in the tube 468 and the tube 424 or the reservoir 400 is the same as the level of water in the reservoir 450.

Each time the flush control unit 180 receives a flush signal from the flush initiation switch 182, it energizes the pump 446 for sufficient time to draw a predetermined volume of water from the filter housing and deliver it to the spray nozzles. This volume of water is about the same as that used for aircraft vacuum toilets, i.e. about 0.2–0.25 l. The pump 446 draws water from the inner chamber 434 of the filter housing 432. Because the filter has a finite flow resistance and the tube 460 is of considerably larger diameter than the tube 424, most of the water drawn by the pump is taken from the clean water reservoir 450, and relatively little is drawn through the filter 438 from the outer chamber 436. However, when the flush control unit switches the pump off, gray water from the reservoir 400 is able to flow through the filter and replenish the clean water reservoir. The gray water is thus ready for immediate delivery to the toilet bowl by the pump 446.

The reservoir 400 acts as a buffer that allows the filter 438 to pass gray water at a slower rate than that at which it is supplied by the hand basin 40, thus minimizing the volume of gray water that needs to be discharged through the overflow 420.

The tube 424 is connected through a valve 472 to a tube 476. In order to clean the system and backwash the filter, the tube 476 is connected to a source of partial vacuum and the valve 472 is opened. Provided the level of water in the reservoir 400 is below the level of the wall 410, the float 416 seals the hole 412 and prevents water from being drawn from the reservoir 400. Consequently, the suction applied to the outer filter chamber 436 results in clean water from the reservoir 450 being drawn through the filter into the outer chamber 436, dislodging solid material from the filter. The solid material is entrained in the flow of water and is removed from the system through the pipe 476. When the reservoir 450 and the tube 460 are empty of water, air is drawn through the filter 438 and enters the outer chamber of the filter housing. This air displaces water from the tube 468 and enters the compartment 406 and allows the water and any solid material in the compartment 406 to be removed by way of the tube 424.

It will be appreciated that the present invention is not restricted to the particular embodiments that have been described and illustrated, and that variations may be made therein without departing from the scope of the invention as defined in the appended claims and equivalents thereof.

For example, in a modification of the FIGS. 1–3 system, the switch 48 is not connected directly to the solenoid 50. On closing the switch 48, a signal is sent to the flush control unit 180, which closes the switch 52, and thereby energizes the solenoid 50, for a predetermined time. The toilet system described with reference to FIGS. 1–3 is not restricted to use in aircraft, and may be applied to other transport vehicles such as trains and buses, and is not restricted to the particular types of pump and motor that have been illustrated. The system described with reference to FIGS. 5 and 6 is not restricted to the particular number and arrangement of bores and grooves, and it is not essential to the invention that the grooves be directed to induce a swirling motion in the same sense as that induced by the bores. Indeed, the grooves may be directed radially, so as not to induce a swirling motion. In order to augment the swirling motion of the air that enters through the bores 352, guiding ribs may be provided at the radially outer surface of flange 304, the ribs being inclined downwards in the counterclockwise direction. Further, although each of the illustrated systems includes an overflow for excess gray water, such an overflow is not always essential. Thus, in the case of the system shown in FIGS. 5 and 6, if the overflow 88 were omitted the excess gray water would flow into the toilet bowl and thence into the waste tank, and so long as the waste tank were large enough to accommodate the extra gray water this would not present a problem.

We claim:
1. A vacuum toilet system comprising:
   (a) a toilet bowl having a rim and an outlet opening,
   (b) a toilet bowl cover mounted for movement relative to the toilet bowl between an open position and a closed position, the cover being in at least partially sealing relation with the rim when in the closed position,
   (c) a sewer pipe having an interior space,
   (d) means for establishing a partial vacuum in the interior space of the sewer pipe,
   (e) a discharge valve connecting the outlet opening of the toilet bowl to the sewer pipe,
   (f) a first pipe defining a liquid supply opening for introducing liquid into the toilet bowl when the cover is in the closed position,
   (g) a source of rinse liquid,
   (h) a second pipe connected to the source of rinse liquid, and
   (i) a reservoir defining a lower compartment into which the second pipe debouches by way of an inlet opening for supplying rinse liquid from the source and from which the first pipe extends, and an upper compartment in direct open communication with the lower compartment, said inlet opening being exposed to substantially the same pressure as the liquid supply opening when the cover is in the open position and the discharge valve is closed,
   whereby rinse liquid is drawn from the reservoir into the toilet bowl by way of the liquid supply opening when the discharge valve is open and the cover is in the closed position.

2. A vacuum toilet system according to claim 1, wherein the second pipe is formed with a hole that opens into the upper compartment.

3. A vacuum toilet system according to claim 1, comprising an air supply member fitted to the toilet bowl at its rim, the air supply member being formed with air supply bores for allowing entry of air into the toilet bowl when the cover of the toilet bowl is in its closed position.

4. A vacuum toilet system according to claim 3, wherein the air supply member includes a flange that extends downwardly into the toilet bowl, whereby an annular space is defined between the flange and the toilet bowl, the air supply bores debouch into said annular space, and the means defining the liquid supply opening comprise a pipe that debouches into said annular space.

5. A vacuum toilet system according to claim 1, installed in a transport vehicle.

6. A vacuum toilet system according to claim 5, wherein the transport vehicle is an aircraft.

7. A vacuum toilet system comprising:
(a) a toilet bowl having a rim and an outlet opening,
(b) a toilet bowl cover mounted for movement relative to the toilet bowl between an open position and a closed position, the cover being in at least partially sealing relation with the rim when in the closed position,
(c) an air supply member fitted to the toilet bowl at its rim, the air supply member being formed with air supply bores for allowing entry of air into the toilet bowl when the cover of the toilet bowl is in its closed position, said air supply member including a flange that extends downwardly into the toilet bowl, whereby an annular space into which the air supply bores debouch is defined between the flange and the toilet bowl,
(d) a liquid supply pipe that debouches into said annular space for introducing liquid into the toilet bowl when the cover is in the closed position,
(e) a sewer pipe having an interior space,
(f) means for establishing a partial vacuum in the interior space of the sewer pipe,
(g) a discharge valve connecting the outlet opening of the toilet bowl to the sewer pipe,
(h) a source of rinse liquid, and
(i) a reservoir having an inlet opening for receiving rinse liquid from the source and an outlet opening in communication with said liquid supply pipe, the inlet opening of the reservoir being exposed to substantially the same pressure as said annular space when the cover is in the open position and the discharge valve is closed, whereby rinse liquid is drawn from the reservoir into the toilet bowl by way of said liquid supply pipe when the discharge valve is open and the cover is in the closed position.

8. A vacuum toilet system according to claim 7, installed in a transport vehicle.

9. A vacuum toilet system according to claim 8, wherein the transport vehicle is an aircraft.

* * * * *